Nov. 19, 1968     E. BEER ET AL     3,412,005
APPARATUS FOR CATHODIC PROTECTION
Filed Jan. 16, 1964
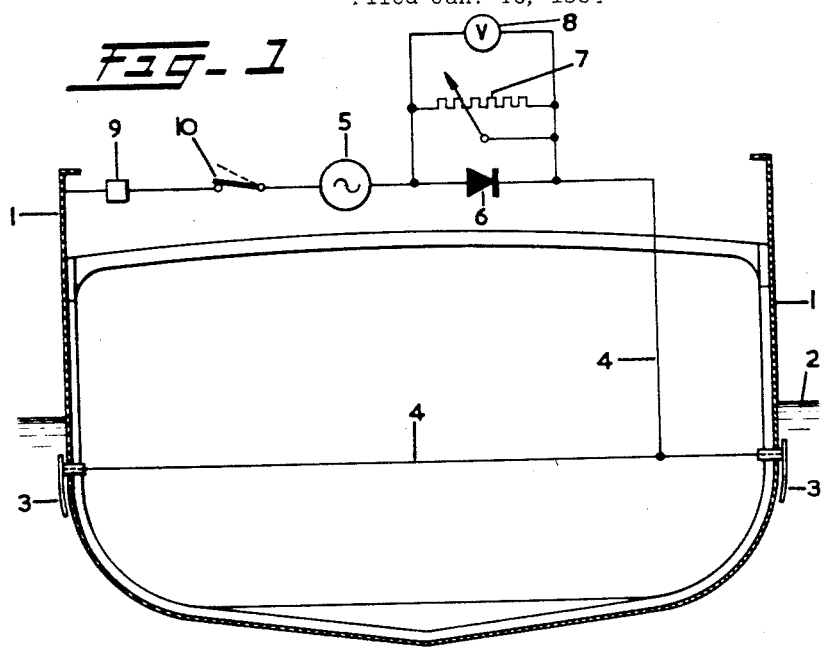
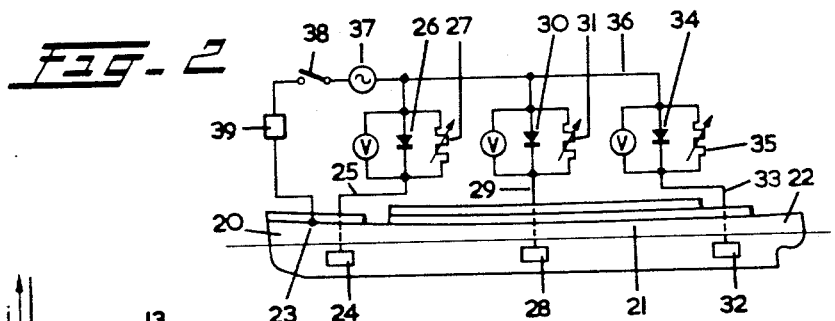
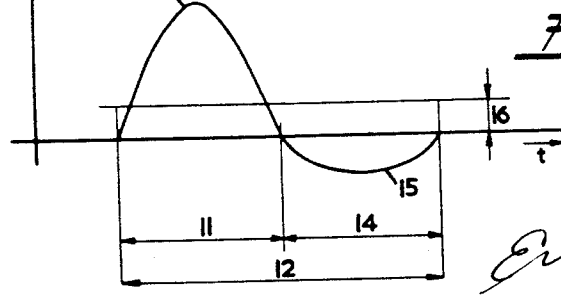
Ernst Beer and
Henri Bernard Beer
INVENTORS
BY Wenderoth,
Lind and Ponack, attys.

United States Patent Office 3,412,005
Patented Nov. 19, 1968

3,412,005
APPARATUS FOR CATHODIC PROTECTION
Ernst Beer, Sladzijde 22, The Hague, and Henri Bernard Beer, Nassaulaan 137, Schiedam, Netherlands
Filed Jan. 16, 1964, Ser. No. 338,076
Claims priority, application Netherlands, Jan. 18, 1963, 287,931
3 Claims. (Cl. 204—196)

ABSTRACT OF THE DISCLOSURE

An apparatus for cathodically protecting a metal object against corrosion in an electrolyte, comprising a source of alternating current, a half wave rectifier, an electrode in an electrolyte, said source of current, rectifier and electrode being connected in series and the object and the source of current being connected in series, and an adjustable resistance shunting said half wave rectifier.

---

The present invention relates to a method for electrically protecting the surface of a metal object against corrosion in electrolytes.

Such a method, in which an impressed voltage is applied, is generally known. Thus, for example, the object on the one hand and an electrode insulated from the object and immersed in the electrolyte on the other hand are connected via a rectifier to a source of alternating current, so that during a complete period of the alternating voltage an anti-corrosion current flows through the electrolyte, directed from the electrode to the object.

Such a method can be employed for the protection against corrosion of ships, piers, bridges, conduits and like objects subjected to corrosion in the ambient electrolytes.

Mostly the object to be protected against corrosion is made of steel.

According to the aforesaid impressed voltage technique, the whole object to be protected is charged by the anti-corrosion current, and this object (the cathode) assumes a negative voltage, the electrode insulated from the object constituting the anode in the electrolyte. In this manner the corrosion current is suppressed.

The area of the object which is in contact with the electrolyte and is to be protected against corrosion, is not always constant, but is, for example, dependent on the degree to which damage is done to the coat of paint with which the surface of the object is covered.

In the case of ships, the area in contact with the electrolyte or the sea water depends on the draught of the ship, connected with the cargo carried and the specific gravity of the water.

In the case of piers, jetties and bridges, the area in contact with the water depends on the level of the wind-and-water line, connected with the water-level at high and low tide.

Naturally, the magnitude of the anti-corrosion current to be supplied depends on the area in contact with the electrolyte, and therefore this current must be controlled. This has hitherto been effected by controlling the voltage supplied by the source of current. For the following reasons, the voltage supplied to the object and to the electrode in accordance with the prior method, cannot be of any chosen magnitude, but is restricted within certain limits.

If the negative voltage supplied to the object to be protected is adjusted at a too high value, a measure which, despite its concomitant disadvantages, will often be resorted to in connection with the damage to the coating of paint to be expected or in connection with the forthcoming water-level at high tide, so-called overprotection occurs, a condition in which the paint starts peeling, the iron may turn brittle, there may occur undesired concentrations of the dissociation products of electrolysis to the object to be protected, and gases are released which may be harmful to the operation of associated apparatus, pipelines, etc.

If the voltage supplies to the object to be protected is set at a too low value, no or at least insufficient protection is obtained.

Practice has shown that a steel object is not corroded in sea water when it has a negative voltage of at least 780 millivolts, measured by means of a valve voltmeter relative to a colomel electrode immersed in the sea water.

Preferably, the voltage to which the object to be protected is charged by the anti-corrosion current is between 780 and 900 millivolts negative, measured relative to a calomel electrode immersed in the sea water. Experiments with steel test plates of 2 m.² have shown the following.

Such a test plate is partly immersed in a stagnant electrolyte, and charged in accordance with the above known method until the plate has in stationary condition a voltage of 830 millivolts negative, measured relative to a calomel electrode. If now the area in contact with the electrolyte is increased by about 20%, a discharge of the test plate occurs, resulting in a voltage drop down to 610 millivolts. This voltage is too little negative to prevent corrosion.

If, in another case, the immersed area is increased by about 20%, the test plate is further charged, resulting in the voltage being increased up to 1400 millivolts. This voltage is so high, that over-protection occurs, with the adverse effects set out hereinbefore.

Besides that the current depends on the variation of the area of the object to be protected which is in contact with the electrolyte, the voltage depends on the nature and the conditions of the electrolyte, whether or not the object and the electrolyte are in motion relative to each other, etc.

The voltage is changed when a ship sails up a river from the sea. During the voyage the voltage varies continually, depending, among other things, upon the nature and the temperature of the sea water and the velocity of the ship.

The voltage is varied when the ship drops anchor in midsea, when the velocity is varied, and when the ship is moored in the harbour.

The regulation of the voltage is a cumbersome and time-consuming operation for the ship's crew, whence attempts have been made to provide an automatic control, which have resulted in expensive control apparatus.

It is an object of the present invention of effect such automatic control by means of a simple apparatus.

To this end, according to the invention, there is passed through the electrolyte, in addition to the anti-corrosion current, which is directed from the source of alternating current through the electrolyte to the object by way of a single phase rectifier during one half of a complete period of the alternating voltage, a counter-current during the second half of such period, directed from the object to the electrode.

According to the invention, the counter-current directed from the object through the electrolyte to the electrode during the second half of a period of the alternating voltage, may be adjusted in dependence upon the voltage of the object relative to the electrolyte.

Furthermore, according to the invention, the counter-current directed from the object through the electrolyte to the electrode during the second half of a period of the alternating voltage, may be reduced automatically when the area of the object to be protected from the electrolyte is increased and vice versa.

According to the invention, the voltage of the object relative to the electrolyte may be measured by means of a volt meter connected to the terminals of the single phase rectifier.

When, in accordance with the method according to the invention, the anti-corrosion current and the countercurrent have been adjusted to the desired ratio, the object to be protected is automatically kept at the desired voltage of 780 to 900 millivolts, measured relative to a calomel electrode in sea water.

The invention further relates to an apparatus for the performance of the new methods.

The apparatus for electrically protecting the surface of a metal object against corrosion in electrolytes, the said object being included in a circuit comprising a source of alternating current, a single phase rectifier and an electrode insulated from the object and to be immersed in the electrolyte, is characterized, according to the invention, by an inert electrode and a resistor included in the said circuit to bridge the single phase rectifier.

According to the invention, the resistance of the resistor bridging the single phase rectifier may be in excess of the resistance of said rectifier in its conducting direction.

Furthermore, according to the invention, the resistance of the resistor bridging the single phase rectifier may be variable.

According to the invention, the electrode may consist of a film-forming metal having a chemically resistant, electrically conductive, porous coating.

According to the invention, the electrode may consist of titanium coated with a thin layer of platinum metals.

According to the invention, the electrode may consist of zirconium coated with magnetite.

According to the invention, the electrode may consist of the carbides of titanium, tantalum or chromium.

According to the invention, the electrode may consist of the nitrides of titanium, tantalum or chromium.

According to the invention, the electrode may consist of the oxides of chromium or iron.

According to the invention, the electrode may consist of titanium or tantalum coated with the nitride of this metal.

According to the invention, the electrode may consist of titanium or tantalum coated with the carbide of this metal.

According to the invention, the circuit may comprise switch means arranged to open the circuit automatically when there is no supply of current.

According to the invention, the resistor bridging the rectifier may be an ohmic resistor.

According to the invention, the resistor bridging the single phase rectifier may be formed of an electrolyte.

According to the invention, a number of electrodes may be divided into groups, each group being connected via a single phase rectifier bridged by a resistor to a common source of alternating current.

The invention will hereinafter be further explained with reference to the drawings, in which:

FIG. 1 shows diagrammatically an example of the apparatus for carrying out the method according to the invention;

FIG. 2 shows diagrammatically an apparatus in which a number of electrodes is divided into groups;

FIG. 3 is a graph of the current gradient during a complete period of the alternating voltage.

FIG. 1 represents in cross-section the steel wall 1 of a ship surrounded by a halogen containing electrolyte 2, such as, for example, sea water.

On the face of the wall of the ship in contact with the electrolyte, electrodes 3 are mounted below the wind-and-water line so as to be insulated from the wall of the ship, and connected in an electric circuit. The electric circuit is from a source 5 of alternating current of variable voltage to a single phase rectifier 6, and thence through conductors 4 to the electrodes 3, through the electrolyte to the wall 1 of the ship, the wall being connected via an automatic switch device 9 and a switch 10 to the source of alternating current 4. The rectifier 6 is so connected in the circuit that the electric current, i.e. the anti-corrosion current, passed by the rectifier in one half of the period of the alternating voltage, is directed in the electrolyte from the electrode 3 to the wall 1 of the ship. The drawing shows the rectifier 6 connected in the circuit between the source of alternating current 5 and the electrode 3. The rectifier may, however, instead be connected in the circuit between the source of alternating current 5 and the switch 10, the conducting direction of the rectifier being such that during one half of the period of the alternating voltage the current through the electrolyte is maintained in the direction from the electrode 3 to the wall 1 of the ship. The conductors 4 are preferably not in contact with the electrolyte 2.

The rectifier is bridged by a resistor 7.

The voltage across the rectifier is measured by means of a voltmeter 8.

The automatic trip device 9 breaks the circuit when, through some cause, the installation is deprived of current, to prevent that the cathodically protected object is discharged via the resistor 7.

According to FIG. 2, a ship is provided with electrodes or groups of electrodes at three points, namely, at the stem 20, in the midship 21, and at the stern 22, where the corrosive effect of the sea water may be different, so that at each of these points a different anti-corrosion current is required. The electrodes are insulated from the hull of the ship and arranged in groups on the starboard and on the port side of the ship.

The group of electrodes 24 at the stem 20 is connected via conductor 25 to the single phase rectifier 26, which is bridged by the variable resistor 27.

The group of electrodes 28 in the midship 21 is connected via conductor 29 to the single phase rectifier 30, which is bridged by the variable resistor 31, and the group of electrodes 32 at the stern 22 is connected via conductor 33 to the single phase rectifier 34, which is bridged by the variable resistor 35.

The rectifiers 26, 30 and 34 are interconnected with conductor 36, leading to a source of alternating current 37 common to all electrodes. The source of current 37 is further connected via the switch 38 and the automatic trip device 39 to the wall 23 of the ship.

The voltage across each of the single phase rectifiers 26, 30, and 34 is measured by means of a voltmeter.

The resistance of the resistor bridging the single phase rectifier is in excess of the resistance of this rectifier in its conducting direction. This resistor may be a variable ohmic resistor, for example, a wire-wound slide-resistance.

The resistor bridging the single phase rectifier may be constituted by an electrolyte which upon variation of the passing current promotes such variation more rapidly than an ohmic resistance. If so desired, the electrolyte may consist of the same medium as the electrolyte in which the object to be protected is immersed.

FIG. 3 is a graph of the current gradient 1 through the circuit during a complete period of the alternating voltage, plotted against the time $t$.

During the first half 11 of a complete period 12, the current 13 through the electrolyte is directed from the electrodes 3 to the wall 1 of the ship. During the second half 14 of the period 12, the current 15 through the electrolyte is directed from the wall 1 of the ship to the electrode 3.

The current 13 charges the object; the current 15 discharges the object. The resistance 7 is so selected that during a complete period the average current 16 is directed to the object to be protected.

The current 16 is the anti-corrosion current, which charges the object to be protected from an initial voltage to the desired negative voltage of, for example, 830 millivolts, which voltage forms a counter-E.M.F. to the current 13 in the conducting direction of the rectifier, and counteracts the voltage of the source of alternating current in the first half of the period. Accordingly, this current 13 in the conducting direction of the rectifier is reduced according as the object to be protected is charged to the desired negative voltage of 830 millivolts.

The current 15 is a counter-current, which discharges the object to be protected. The counter-E.M.F. at which the object to be protected is charged, acts in the same direction as that of the alternating voltage in the second half of the period. Therefore, according as the counter-E.M.F. of the object to be protected is increased, the counter-current 15 is increased as well. In operation the following phenomena occur. When the area of the object to be protected is increased, the counter-current is decreased and the anti-corrosion current is increased, so that the voltage of the object to be protected remains constant. When the area to be protected of the object is reduced, the counter-current is increased and the anti-corrosion current is decreased, so that the voltage of the object to be protected remains constant.

The electrodes consist of an inert material which is not dissolved in the electrolyte, such as a film-forming metal having a chemically resistant, electrically conductive, porous coating. The electrodes may consist of titanium or tantalum coated with a thin layer of platinum. The electrodes may consist of zirconium coated with magnetite, or of the carbides of titanium, tantalum or chromium, or of the oxides of chromium or iron.

The electrodes may consist of titanium or tantalum coated with the nitride or carbide of this metal by means of a chemical surface treatment.

The resistance of the resistor 7 is variable. The resistance is set at a constant value determined in conjunction with the area to be protected and the increase of this area to be expected.

The voltmeter 8 indicates the voltage across the rectifier 6. It has been found that when electrodes are used of a material which is inert to the electrolyte 2 during the electrolysis, the reading of the voltmeter 8 is indicative of the voltage of the wall 1 of the ship relative to the electrode 3, which voltage can be interpreted for the voltage of the ship relative to a calomel electrode.

As regards the adjustment of the resistor 7 according to the invention, in calculating the installation, the starting point should be the overall increase of the area to be protected which should be reckoned with. If the object to be protected is, for example, a ship, it may be assumed that through various causes the well-painted ship will loose, for example, 35% of its coat of paint after some time of navigation. The installation should accordingly be based on this.

Taking account of the fact that 35% of the paint is lost during navigation, the installation according to the invention is calculated on the power required when 35% of the ship is bare. In putting the installation into operation on board the ship, which is supposedly newly painted, so that considerably less energy is required, the resistor 7 is so adjusted that, for example, 12 hours after the intallation has been put into operation, the required potential of 830 millivolts measured relative to a calomel electrode is built up. If now the counter-current component has been adjusted too high, the potential will be lower than 830 millivolts (under-protection): if the counter-current component has been adjusted too low, the potential of the ship will be too high (over-protection). The counter-current component is corrected by means of the variable resistor 7 until the desired average voltage of 830 millivolts is obtained. The average direct current is then, for example, 200 ma. per square metre of area in contact with the electrolyte. It has been found that, once the proper adjustment has been obtained, no further adjustment is necessary, and that upon variation of the area, or in the event of other factors occurring, the potential set is automatically substantially maintained.

The determination of the potential of a ship by means of a reference electrode is rather cumbersome, especially when the ship is sailing, because the electrode is very vulnerable and may easily be damaged.

In order to provide nevertheless a permanent check of the required potential of the object to be protected (e.g. a ship), without requiring remote reference electrodes, the voltage meter 8 is connected across the single phase bridged rectifier 6. Experiments have shown that the voltage indicated by it is indicative of the overall potential of the cathodically protected object.

The choice of the anodes in this system is very important, and only those anodes which are entirely inert can be used. Examples of these are platinum coated film-forming metals, such as titanium, tantalum, zirconium; further the carbides, nitrides and oxides as a body or as a coating upon other metals, but of those metals, the carbides, oxides, nitrides are chemically resistant and are electrically conductive.

We claim:
1. An apparatus for cathodically protecting a metal object against corrosion in an electrolyte, comprising a source of alternating current, a half wave rectifier, an electrode in an electrolyte, said source of current, rectifier and electrode being connected in series and the object and the source of current being connected in series, and an adjustable resistance shunting said half wave rectifier.
2. An apparatus as claimed in claim 1 in which said adjustable resistance is adjustable between a value which is larger and a value which is smaller than the resistance of the rectifier measured in the conducting direction.
3. An apparatus as claimed in claim 1 in which the electrode consists of chromium oxide.

References Cited

UNITED STATES PATENTS

| | | | |
|---|---|---|---|
| 1,736,986 | 11/1929 | Thalhofer | 204—196 |
| 2,419,431 | 4/1947 | Williams | 318—223 |
| 2,636,856 | 4/1953 | Suggs et al. | 204—290 |
| 3,081,252 | 3/1963 | Preiser et al. | 204—147 |
| 3,135,677 | 6/1964 | Fischer | 204—176 |

FOREIGN PATENTS

| | | |
|---|---|---|
| 657,392 | 9/1951 | Great Britain. |
| 825,184 | 12/1959 | Great Britain. |
| 643,672 | 6/1962 | Canada. |
| 221,757 | 6/1959 | Australia. |
| 3,718,369 | 11/1962 | Japan. |

OTHER REFERENCES

Wilson: Corrosion, vol. 16, No. 3, March 1960, pp. 145t–148t.

National Bureau of Standards, Circular 579, April 1957, pp. 180 and 181.

HOWARD S. WILLIAMS, *Primary Examiner.*

T. TUNG, *Assistant Examiner.*